(12) United States Patent
Hsiao et al.

(10) Patent No.: US 8,928,823 B2
(45) Date of Patent: Jan. 6, 2015

(54) 3D DISPLAY DEVICE ADOPTING HALF-SOURCE DRIVING STRUCTURE

(75) Inventors: Chia-chiang Hsiao, Shenzhen (CN); Chih-wen Chen, Shenzhen (CN)

(73) Assignee: Shenzhen China Star Optoelectronics Technology Co. Ltd., Shenzhen (CN)

( * ) Notice: Subject to any disclaimer, the term of this patent is extended or adjusted under 35 U.S.C. 154(b) by 0 days.

(21) Appl. No.: 13/581,479

(22) PCT Filed: May 7, 2012

(86) PCT No.: PCT/CN2012/075108
§ 371 (c)(1),
(2), (4) Date: Aug. 28, 2012

(87) PCT Pub. No.: WO2013/159382
PCT Pub. Date: Oct. 31, 2013

(65) Prior Publication Data
US 2014/0307187 A1    Oct. 16, 2014

(30) Foreign Application Priority Data
Apr. 27, 2012 (CN) .......................... 2012 1 0128371

(51) Int. Cl.
G02F 1/1335 (2006.01)
G02F 1/133 (2006.01)
G02B 27/26 (2006.01)
G02F 1/1362 (2006.01)

(52) U.S. Cl.
CPC ............ *G02F 1/13306* (2013.01); *G02B 27/26* (2013.01); *G02F 1/136209* (2013.01); *G02F 1/136286* (2013.01)
USPC ................................................ 349/15; 349/45

(58) Field of Classification Search
USPC ....................................................... 349/15, 45
See application file for complete search history.

(56) References Cited

U.S. PATENT DOCUMENTS

2009/0310044 A1* 12/2009 Lee .................................. 349/15

* cited by examiner

*Primary Examiner* — Phu Vu
(74) *Attorney, Agent, or Firm* — Mark M. Friedman

(57) ABSTRACT

The present invention discloses a 3D display device adopting a half-source driving structure. The 3D display device includes a liquid crystal display panel. Gate lines and data lines of the liquid crystal panel are crossed with each other and define multiple pixel regions. Each gate line is bent to have a plurality of arched portions that each arched portion corresponds in position to one pixel region and forms an accommodating area. A switching element in each one of the pixel regions is mounted in the corresponding accommodating area and connected to a pixel electrode. Because the accommodating areas formed by the gate lines can accommodate switching elements, light-exiting positions of the pixel electrodes in adjacent pixel regions can be in line with each other to avoid a color washout problem when the phase retarder film is mounted with a positional error.

12 Claims, 6 Drawing Sheets

3D DISPLAY DEVICE ADOPTING HALF-SOURCE DRIVING STRUCTURE

BACKGROUND OF THE INVENTION

1. Field of the Invention

The present invention relates to a 3D image display technology, especially to a 3D display device adopting a half-source driving structure.

2. Description of the Related Art

Because there is a distance between two eyes of a person, each of the eyes watches an object from a different direction. Therefore, a 3D display device uses human interocular difference to provide different images to the eyes, respectively, to generate a three-dimensional effect.

With reference to FIG. 1, a conventional 3D display system is disclosed and has a phase retarder film constituted by a patterned half-wave phase retarder layer 90 and a quarter-wave phase retarder layer 91 and mounted on a light-exiting surface of a liquid crystal display panel so as to output images having different polarization directions to an observer; and the observer wears a pair of polarized glasses 7 to receive the images having one polarization direction with his left eye and receive the images having another polarization direction with his right eye so as to create three-dimensional images in his brain. Generally speaking, the liquid crystal display panel of the 3D-display system uses images displayed by odd (or even) pixel rows as left-eye input images and images displayed by the other pixel rows as right-eye input images.

With reference to FIG. 1, images of the liquid crystal display panel of the 3D-display system will first travel through a polarizer to become linearly polarized images 80. The linearly polarized images 80 then travel through the patterned half-wave phase retarder film 90. Lights of the linearly polarized images will be separated into two sets of linearly polarized images 81 with mutually perpendicular polarization directions. The two sets of linearly polarized images 81 then travel through the quarter-wave phase retarder film 91 and output images 82 including left-handed circularly polarized images and right-handed circularly polarized images for being the left-eye input images and right-eye input images. Each of the lenses 71, 72 of polarized glasses 7 worn by the observer is constituted by a quarter-wave plates and a polarizer. The left-handed circularly polarized images and right-handed circularly polarized images 82 first travel through the quarter-wave plates of the lenses 71, 72 to be converted into linearly polarized images and then travel through the polarizers of the lenses 71, 72 and arrive at the left and right eyes, respectively. Because the polarizers of the lenses 71, 72 has different polarization directions, the user's left eye can only see the left-eye input images and the right eye can only see the right-eye input images. Hence, it can achieve a three-dimensional effect.

With reference to FIG. 2, FIG. 2 is a partial schematic view showing that a phase retarder film is correspondingly mounted on a liquid crystal display panel of a conventional 3D display system. The liquid crystal display panel of the conventional display system includes a plurality of gate lines 51, a plurality of data lines 50 being crossed with the gate lines 51 and a plurality of pixel region being defined by the gate lines 51 and the data lines 50. Each one of the pixel regions has a thin-film transistor and a pixel electrode 52 mounted therein. The pixel regions are divided into a plurality of pixel rows. The phase retarder film 60 has a plurality of first phase retarder areas 60A and a plurality of second phase retarder areas 60B, wherein the first phase retarder areas 60A and the second phase retarder areas 60B are alternately arranged with each other and have different liquid crystal orientations. Borders between the adjacent first phase retarder areas 60A and the second phase retarder areas 60B of the phase retarder film are respectively positioned between the adjacent pixel rows, and the borders between the adjacent first phase retarder areas 60A and the second phase retarder areas 60B are covered by black matrix 53 between the adjacent pixel rows.

With further reference to FIG. 3, since the cost of source driving circuits is higher than that of gate driving circuits, in order to reduce the use of source driving circuits, another conventional 3D display system adopts a pixel driving structure with half-source driver circuits. In the half source driver circuits, the number of the data lines 50 used in the source driving circuits is cut by half and each of the original gate line 51 is doubled to two gate lines 51a, 51b. Hence, the cost can be reduced while maintaining the same number of pixels by reducing the number of data lines in the source driving circuits.

However, in the pixel driving structure of half-source driving circuits shown in FIG. 3, when one of the pixel electrodes 52 is connected to a thin-film transistor which is positioned at an upper side of the pixel electrode 52, the adjacent pixel electrode 52 is connected to another thin-film transistors which is positioned at a lower side of this adjacent pixel electrode 52. Because space for each of the pixel region is fixed, two of the pixel electrodes 52 adjacent to each other in the same pixel row differ in light-exiting position. In order to cover the gate lines 51, the data lines 50 and the thin-film transistors, as shown in FIG. 4, the black matrix 53 will have regular convexity portions formed at two opposite sides of each gate line 51 and corresponding to the positions of the thin-film transistors for correspondingly covering those thin-film transistors. Thus, when the phase retarder film 60 shown in FIG. 2 is mounted with a positional error, the pixel electrodes 52 adjacent to each other in the same pixel row will differ in light transmittance area, and this will lead to a color washout problem to the 3D display system.

Therefore, it is necessary to provide a 3D display device adopting a half-source driving structure to overcome the problems existing in the conventional technology.

SUMMARY OF THE INVENTION

In view of the shortcomings of the conventional technology, the main objective of the invention is to provide a 3D display device adopting a half-source driving structure that can avoid a color washout problem when the phase retarder film is mounted with a positional error.

In order to achieve the foregoing object of the present invention, the present invention provides a 3D display device comprising:

a liquid crystal display panel having a plurality of gate lines, a plurality of data lines, wherein the gate lines and the data lines are crossed with each other to define a plurality of pixel regions; each gate line is bent to have a plurality of arched portions that each arched portion corresponds in position to one of the pixel regions and forms an accommodating area; each pixel region has at least one switching element and at least one pixel electrode; and the at least one switching element is mounted in the accommodating area of the corresponding arched portion and is connected to the corresponding gate line and the corresponding pixel electrode; and a phase retarder film mounted on an outer side surface of the liquid crystal display panel.

In one embodiment of the present invention, the liquid crystal display panel has a plurality of pixel units, and each pixel unit includes a first gate line, a second gate line, a first data line, a second data line, a first pixel electrode, a second pixel electrode, a first switching element and a second switching element, wherein the first gate line and the second gate line are crossed with the first data line and the second data line to form one of the pixel regions; the first pixel electrode and the second electrode are arranged side by side in the pixel region; the first gate line is partially bent to have an arched portion forming a first accommodating area; the first switching element is mounted in the first accommodating area and connected to the first gate line, the first data line and the first pixel electrode; the second gate line is partially bent to have an arched portion forming a second accommodating area; and the second switching element is mounted in the second accommodating area and connected to the second gate line, the second data line and the second pixel electrode.

In one embodiment of the present invention, each of the pixel units further includes a first storage capacitor and a second storage capacitor; the first storage capacitor is mounted in the first accommodating area and connected to the first switching element; and the second storage capacitor is mounted in the second accommodating area and connected to the second switching element.

In one embodiment of the present invention, the switching element is a thin-film transistor.

In one embodiment of the present invention, the phase retarder film provides a plurality of first phase retarder rows and a plurality of second phase retarder rows, and the first phase retarder rows and the second phase retarder rows are alternately arranged.

In one embodiment of the present invention, the first phase retarder rows correspond in position to odd rows among the pixel regions; and the second phase retarder rows correspond in position to even rows among the pixel regions.

In one embodiment of the present invention, the phase retarder film is a multilayer optical film including a quarter-wave liquid crystal retarder film and a patterned half-wave liquid crystal retarder film.

In one embodiment of the present invention, the patterned half-wave liquid crystal retarder film includes a plurality of half-wave phase retarder rows and a plurality of isotropic material rows, and the half-wave phase retarder rows and the isotropic material rows are alternately arranged.

In one embodiment of the present invention, for the pixel units in the same row, the second data line of one of the pixel units is further connected to the first switching element of another adjacent pixel unit.

In one embodiment of the present invention, the liquid crystal display panel further includes black matrix, and the black matrix covers the gate lines, the data lines and the switching elements.

The present invention further provides another 3D display device adopting a half-source driving structure comprising:

a liquid crystal display panel having a plurality of gate lines, a plurality of data lines, wherein the gate lines and the data lines are crossed with each other to define a plurality of pixel regions; each gate line is bent to have a plurality of arched portions that each arched portion corresponds in position to one of the pixel regions and forms an accommodating area; each pixel region has at least one switching element and at least one pixel electrode; and the at least one switching element is mounted in the accommodating area of the corresponding arched portion and is connected to the corresponding gate line and the corresponding pixel electrode; and a phase retarder film is mounted on an outer side surface of the liquid crystal display panel, and the phase retarder film provides a plurality of first phase retarder rows and a plurality of second phase retarder rows, wherein the first phase retarder rows and the second phase retarder rows are alternately arranged; the first phase retarder rows correspond in position to odd rows among the pixel regions; and the second phase retarder rows correspond in position to even rows among the pixel regions.

The present invention is to bend each gate line to form accommodating areas for accommodating switching elements such that the light-exiting positions of the pixel electrodes in the adjacent pixel regions can be in line with each other without considering the positions of the switching elements to avoid a color washout problem when the phase retarder film is mounted with a positional error.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 5:
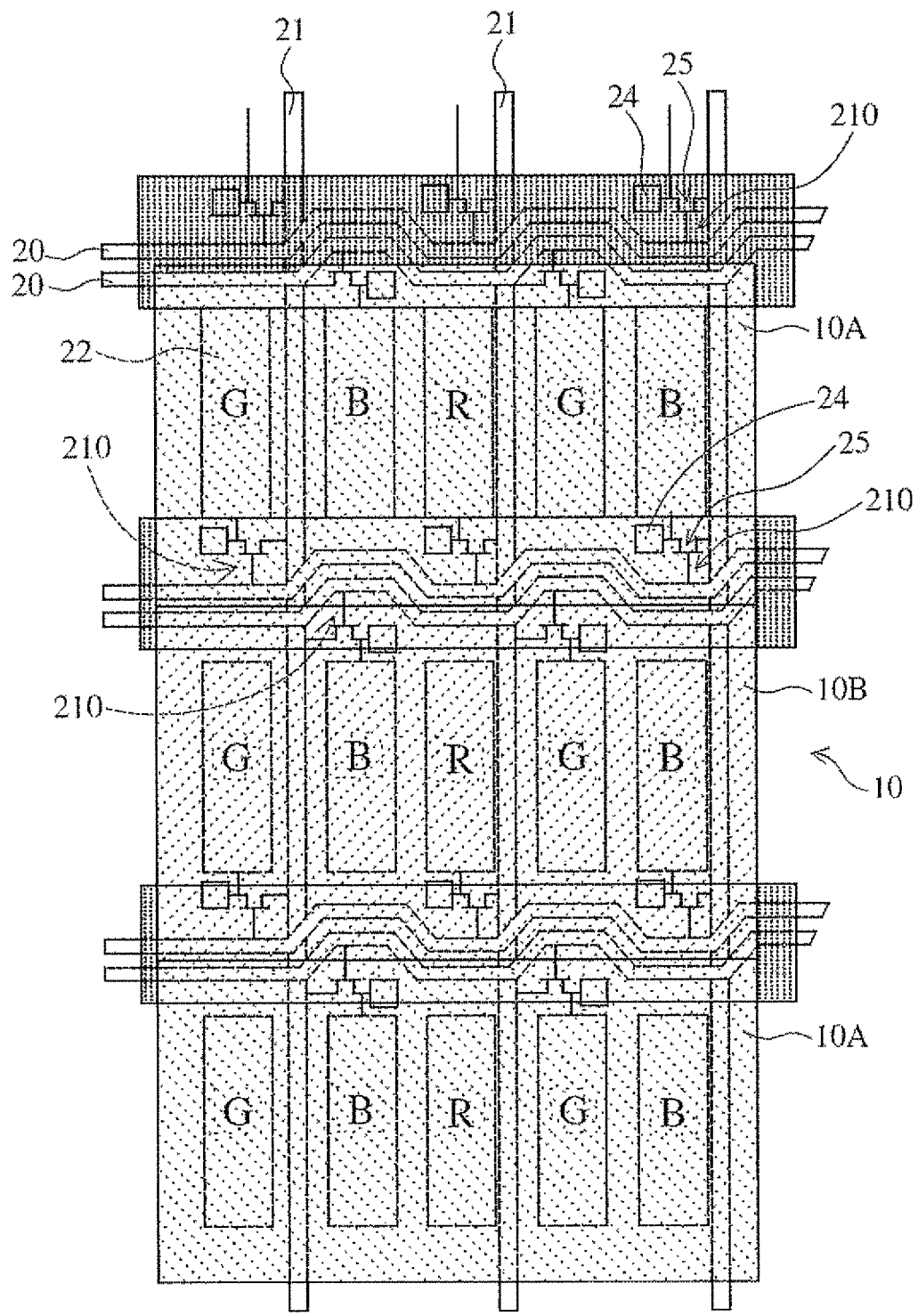
FIG. 5 is a partial schematic view of a phase retarder film being correspondingly mounted on a liquid crystal display panel according to a preferred embodiment of a 3D display device adopting half-source driving structure in accordance with the present invention.

With reference FIG. 5, FIG. 5 is a partial schematic view of a phase retarder film being correspondingly mounted on a liquid crystal display panel according to a preferred embodiment of a 3D display device adopting half-source driving structure in accordance with the present invention. The 3D display device includes a liquid crystal display panel and a phase retarder film 10. The liquid crystal display panel includes a plurality of gate lines 20, a plurality of data lines 21, and the gate lines 20 and the data lines are crossed with each other to define a plurality of pixel regions. Each gate line 20 is bent to provide a plurality of arched accommodating areas 210 corresponding in position to each pixel region, and each pixel region has at least one switching element 25 and at least one pixel electrode 22. The at least one switching element 25 is mounted in the corresponding arched accommodating area 210 and is connected to the corresponding gate line 20 and the corresponding pixel electrode 22. The at least one switching element 25 is preferably a thin-film transistor. The phase retarder film is mounted on an outer side surface of the liquid crystal display panel.

Figure 6:
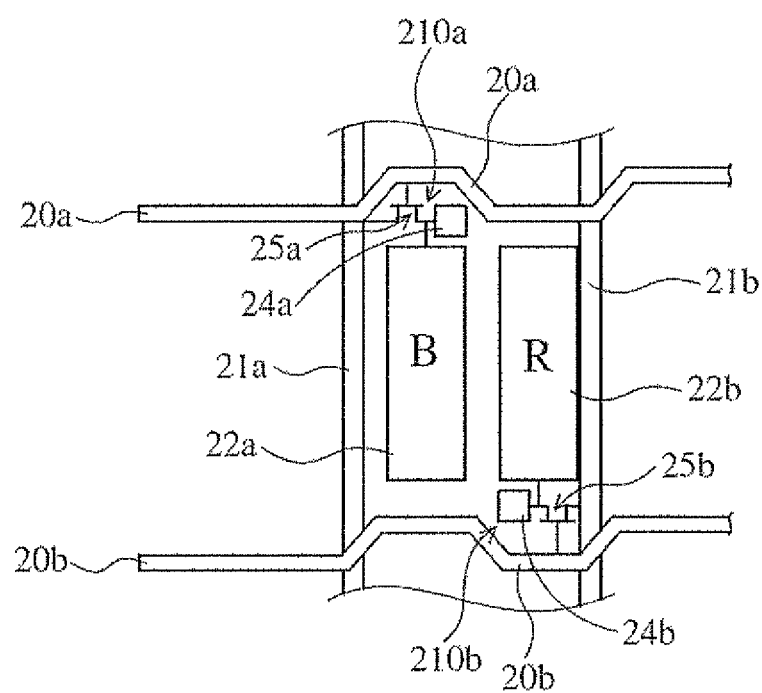
FIG. 6 is a partial enlarged schematic view of one pixel unit in FIG. 5.

In more details, with further reference to FIG. 6, FIG. 6 is a partial enlarged schematic view of a pixel unit in FIG. 5. The liquid crystal display panel includes a pixel array, and the pixel array has a plurality of pixel units. Each pixel unit includes a first gate line 20a, a second gate line 20b, a first data line 21a, a second data line 21b, a first pixel electrode 22a, a second pixel electrode 22b, a first switching element 25a and a second switching element 25b, and further includes a first storage capacitor 24a and a second storage capacitor 24b. The first gate line 20a and the second gate line 20b are crossed with the first data line 21a and the second data line 21b to form one of the pixel regions. The first pixel electrode 22a and the second electrode 22b are arranged side by side in the pixel region. The first gate line 20a is partially bent to have an arched first accommodating area 210a, and the first switching element 25a is mounted in the first accommodating area 210a and connected to the first gate line 20a, the first data line 21a and the first pixel electrode 22a. The second gate line 20b is partially bent to have an arched second accommodating area 210b, and the second switching element 25b is mounted in the second accommodating area 210b and connected to the second gate line 20b, the second data line 21b and the second pixel electrode 22b. The first storage capacitor 24a is mounted in the first accommodating area 210a and connected to the first switching element 25a. The second storage capacitor 24b is mounted in the second accommodating area 210b and connected to the second switching element 25b. The first switching element 25a and the second switching element 25b are preferably thin-film transistors.

Since the present invention is a 3D display device adopting half-source driving structure, for the pixel units in the same row, the second data line 21b is not only connected to the second switching element 25b of one of the pixel units but also connected to the first switching element 25a of another adjacent pixel unit.

Figure 1:
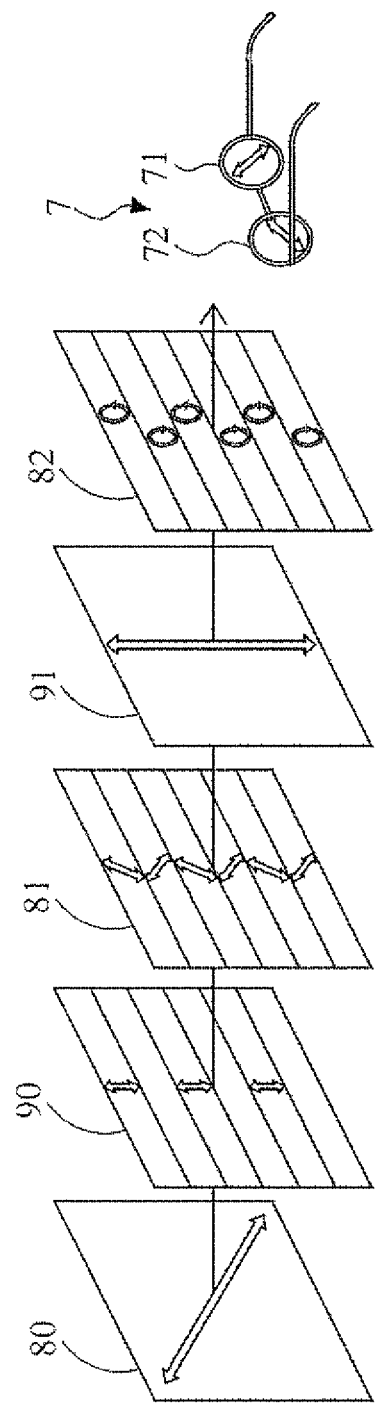
FIG. 1 is a schematic view of polarization status of light in a conventional 3D display system.
Figure 2:
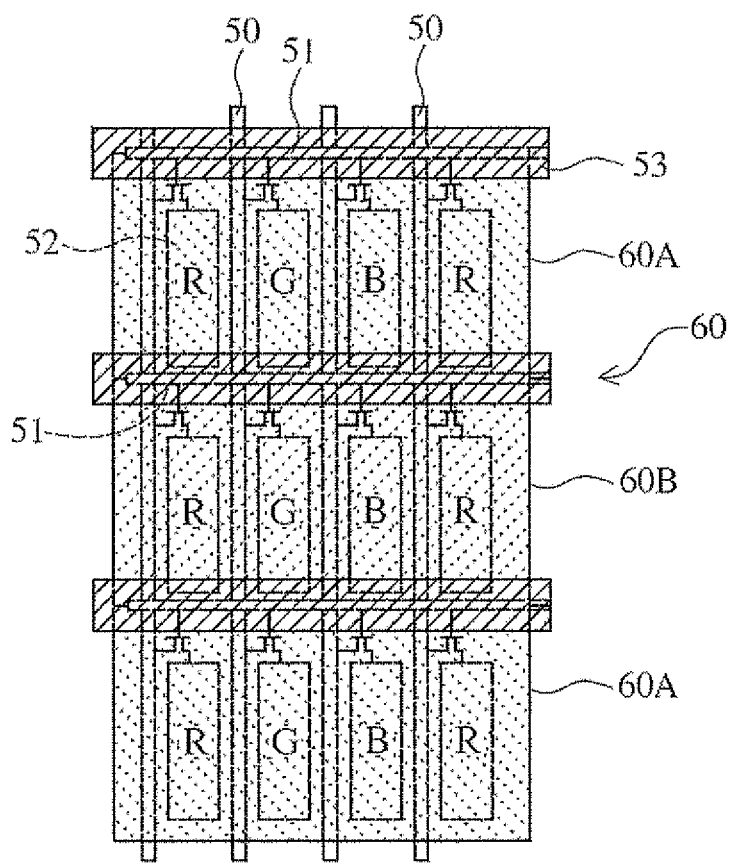
FIG. 2 is a partial schematic view of a phase retarder film being correspondingly mounted on a liquid crystal display panel of a conventional 3D display system.
Figure 3:
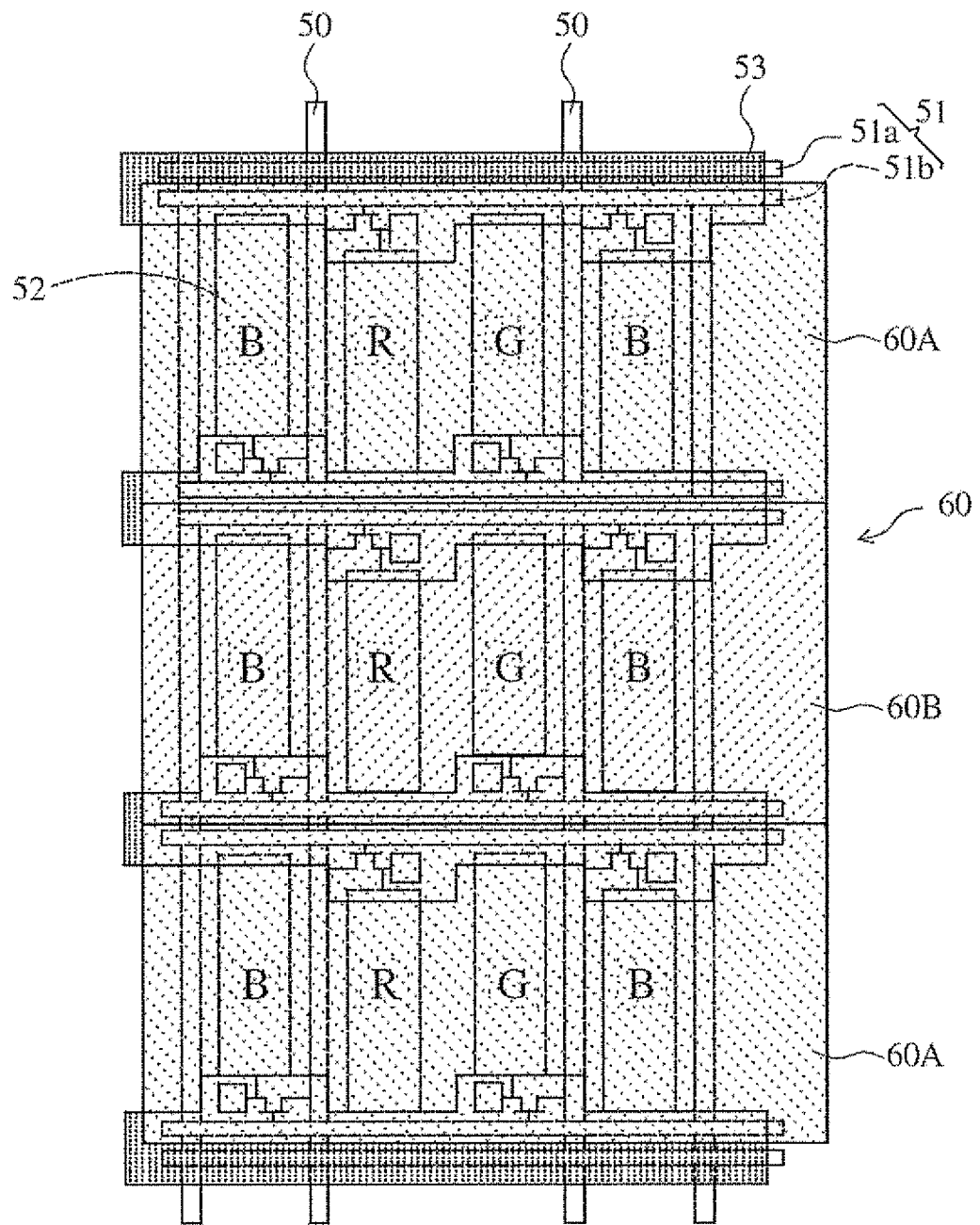
FIG. 3 is a partial schematic view of a phase retarder film being correspondingly mounted on a liquid crystal display panel of another conventional 3D display system.
Figure 4:
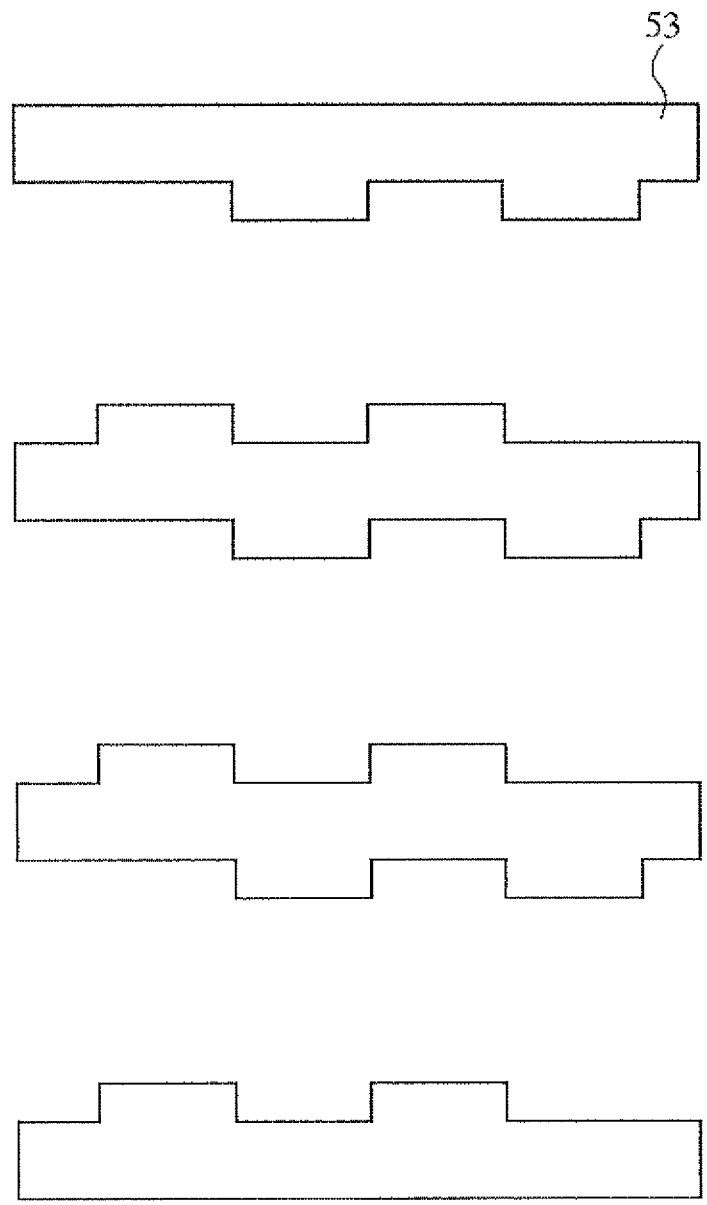
FIG. 4 is a partial schematic view illustrating the shape of black matrix in the 3D display system in FIG. 3.

Generally speaking, the main structure of the liquid crystal display panel (not shown in figure) comprises a first substrate, a second substrate, a liquid crystal layer, a first polarizer and a second polarizer. The first substrate may be a glass having a color filter or a substrate made of other material. The color filter has photo-resist units with different colors. The pixel array is mounted on the second substrate, that is, the gate lines 20, the data lines 21, the switching elements 25 and the pixel electrodes 22 are mounted on the second substrate. The pixel regions defined by the gate lines 20 and the data lines 21 correspond to the photo-resist units of the color filter. As shown in FIG. 3, the color filter on the first substrate may further have black matrix 23 for correspondingly covering the gate lines 20, the data lines 21 and the switching elements 25. The liquid crystal layer is formed between the first substrate and the second substrate. The first polarizer is mounted on an outer side surface of the first substrate (that is, the light-exiting side of the first substrate). The second polarizer is mounted on an outer side surface of the second substrate (that is, the incident side of the second substrate). The 3D display device further includes a backlight module being mounted at an outer side of the second polarizer to provide a light source to emit lights through the second polarizer. The phase retarder film 10 is mounted at an outer surface of the first polarizer.

The phase retarder film 10 is preferably a multilayer optical film including a quarter-wave liquid crystal retarder film and a patterned half-wave liquid crystal retarder film and provides a plurality of first phase retarder rows 10A and a plurality of second phase retarder rows 10B. The first phase retarder rows 10A and the second phase retarder rows 10B are alternately arranged. Furthermore, the first phase retarder rows 10A preferably correspond in position to odd rows (or even rows) among the pixel regions; and the second phase retarder rows 10B preferably correspond in position to even rows (or odd rows) among the pixel regions. In one embodiment, the patterned half-wave liquid crystal retarder film includes a plurality of half-wave phase retarder rows and a plurality of isotropic material rows, wherein the half-wave phase retarder rows and the isotropic material rows are alternately arranged. An angle between an optical axis of each of the first phase retarder rows 10A and a transmission axis of the second polarizer is preferably 135 degrees (margin of error: ±15 degrees).

An angle between an optical axis of each of the second phase retarder rows 10B and a transmission axis of the second polarizer is preferably 45 degrees (margin of error: ±15 degrees).

The operation theory of the 3D display device of the present invention is described as follow:

The first polarizer of the liquid crystal display panel converts images outputted from the liquid crystal display panel into linearly polarized images. The linearly polarized images then travel through the phase retarder film 10, wherein the linearly polarized images passing through the first phase retarder rows 10A become left-handed circularly polarized images (or right-handed circularly polarized images); and the linearly polarized images passing through the second phase retarder rows 10B become right-handed circularly polarized images (or left-handed circularly polarized images). The user can wear a pair of polarized glasses to receive the left-handed circularly polarized images and the right-handed circularly polarized images respectively with his two eyes so as to generate three dimensional visual effects.

Besides, the accommodating area formed by the gate line can accommodate the switching element and the storage capacitor such that the pixel electrodes of the adjacent pixel regions arranged in the same row can be aligned with each other. Hence, it is not necessary for the pixel electrodes to be adjusted according to the positions of the switching element and the storage capacitor, in other words, it means that the light-exiting positions can be in line with each other, meanwhile it also means that the black matrix 23 does not need to have regular convexity portions formed at opposite sides of each gate line 51. Therefore, a color washout problem can be avoided when the phase retarder film is mounted with a positional error.

By the above description, comparing with the shortcoming of the conventional technology, the present invention bends the gate lines to form accommodating areas for accommodating switching elements, such that the light-exiting positions of the pixel electrodes of the adjacent pixel regions arranged in the same row can be in line with each other and further avoid a color washout problem when the phase retarder film is mounted with a positional error.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A 3D display device adopting a half-source driving structure, wherein the 3D display device comprises:
   a liquid crystal display panel having a plurality of gate lines, a plurality of data lines, wherein the gate lines and the data lines are crossed with each other to define a plurality of pixel regions; each gate line is bent to provide a plurality of arched accommodating areas corresponding in position to each pixel region; each pixel region has at least one switching element and at least one pixel electrode; and the at least one switching element is mounted in the corresponding arched accommodating area and is connected to the corresponding gate line and the corresponding pixel electrode; and a phase retarder film is mounted on an outer side surface of the liquid crystal display panel, and the phase retarder film provides a plurality of first phase retarder rows and a plurality of second phase retarder rows, wherein the first phase retarder rows and the second phase retarder rows are alternately arranged; the first phase retarder rows correspond in position to odd rows among the pixel regions; and the second phase retarder rows correspond in position to even rows among the pixel regions.

2. The 3D display device adopting a half-source driving structure as claimed in claim 1, wherein the liquid crystal display panel has a plurality of pixel units, and each pixel unit includes a first gate line, a second gate line, a first data line, a second data line, a first pixel electrode, a second pixel electrode, a first switching element and a second switching element, wherein the first gate line and the second gate line are crossed with the first data line and the second data line to form one of the pixel regions; the first pixel electrode and the second electrode are arranged side by side in the pixel region; the first gate line is partially bent to have an arched portion forming a first accommodating area; the first switching element is mounted in the first accommodating area and connected to the first gate line, the first data line and the first pixel electrode; the second gate line is partially bent to have an arched portion forming a second accommodating area; and the second switching element is mounted in the second accommodating area and connected to the second gate line, the second data line and the second pixel electrode.

3. A 3D display device adopting a half-source driving structure, comprising:

a liquid crystal display panel having a plurality of gate lines, a plurality of data lines, wherein the gate lines and the data lines are crossed with each other to define a plurality of pixel regions; each gate line is bent to have a plurality of arched portions that each arched portion corresponds in position to one of the pixel regions and forms an accommodating area; each pixel region has at least one switching element and at least one pixel electrode; and the at least one switching element is mounted in the accommodating area of the corresponding arched portion and is connected to the corresponding gate line and the corresponding pixel electrode; and a phase retarder film mounted on an outer side surface of the liquid crystal display panel.

4. The 3D display device adopting a half-source driving structure as claimed in claim 3, wherein the liquid crystal display panel has a plurality of pixel units, and each pixel unit includes a first gate line, a second gate line, a first data line, a second data line, a first pixel electrode, a second pixel electrode, a first switching element and a second switching element, wherein the first gate line and the second gate line are crossed with the first data line and the second data line to form one of the pixel regions; the first pixel electrode and the second electrode are arranged side by side in the pixel region; the first gate line is partially bent to have an arched portion forming a first accommodating area; the first switching element is mounted in the first accommodating area and connected to the first gate line, the first data line and the first pixel electrode; the second gate line is partially bent to have an arched portion forming a second accommodating area; and the second switching element is mounted in the second accommodating area and connected to the second gate line, the second data line and the second pixel electrode.

5. The 3D display device adopting a half-source driving structure as claimed in claim 4, wherein each of the pixel units further includes a first storage capacitor and a second storage capacitor; the first storage capacitor is mounted in the first accommodating area and connected to the first switching element; and the second storage capacitor is mounted in the second accommodating area and connected to the second switching element.

6. The 3D display device adopting a half-source driving structure as claimed in claim 3, wherein the switching element is a thin-film transistor.

7. The 3D display device adopting a half-source driving structure as claimed in claim 3, wherein the phase retarder film provides a plurality of first phase retarder rows and a plurality of second phase retarder rows, and the first phase retarder rows and the second phase retarder rows are alternately arranged.

8. The 3D display device adopting a half-source driving structure as claimed in claim 7, wherein the first phase retarder rows correspond in position to odd rows among the pixel regions; and the second phase retarder rows correspond in position to even rows among the pixel regions.

9. The 3D display device adopting a half-source driving structure as claimed in claim 7, wherein the phase retarder film is a multilayer optical film including a quarter-wave liquid crystal retarder film and a patterned half-wave liquid crystal retarder film.

10. The 3D display device adopting a half-source driving structure as claimed in claim 9, wherein the patterned half-wave liquid crystal retarder film includes a plurality of half-wave phase retarder rows and a plurality of isotropic material rows, and the half-wave phase retarder rows and the isotropic material rows are alternately arranged.

11. The 3D display device adopting a half-source driving structure as claimed in claim 4, wherein for the pixel units in the same row, the second data line of one of the pixel units is further connected to the first switching element of another adjacent pixel unit.

12. The 3D display device adopting a half-source driving structure as claimed in claim 3, wherein the liquid crystal display panel further includes black matrix, and the black matrix covers the gate lines, the data lines and the switching elements.

* * * * *